(12) United States Patent
Knepper

(10) Patent No.: US 6,212,469 B1
(45) Date of Patent: Apr. 3, 2001

(54) DEVICE FOR MEASURING AND DISPLAYING VARIOUS TRAVEL INFORMATION

(75) Inventor: Jonathan D. Knepper, Allentown, PA (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/158,055

(22) Filed: Sep. 22, 1998

(51) Int. Cl.$^7$ ............................................. G01S 5/02
(52) U.S. Cl. ............................................. 701/201; 701/213
(58) Field of Search ...................... 701/201, 213, 701/200, 204; 342/357.06, 357.08; 368/14

(56) References Cited

U.S. PATENT DOCUMENTS

| | | | |
|---|---|---|---|
| 4,285,041 | * 8/1981 | Smith | 364/415 |
| 4,387,437 | * 6/1983 | Lowrey et al. | 702/160 |
| 4,694,694 | * 9/1987 | Vlakancic et al. | 73/386 |
| 4,819,217 | * 4/1989 | Houlihan | 368/10 |
| 4,887,249 | * 12/1989 | Thinesen | 368/10 |
| 4,977,509 | * 12/1990 | Pitchford et al. | 701/207 |
| 5,470,233 | * 11/1995 | Fruchterman et al. | 434/112 |
| 5,557,524 | * 9/1996 | Maki | 701/35 |
| 5,757,731 | * 5/1998 | Rosenberg | 368/242 |
| 5,790,477 | * 8/1998 | Hauke | 368/10 |
| 5,905,460 | * 5/1999 | Odagiri et al. | 701/213 |
| 5,917,434 | * 6/1999 | Murphy | 340/991 |
| 6,009,138 | * 12/1999 | Slusky | 377/5 |
| 6,013,007 | * 1/2000 | Root et al. | 482/8 |
| 6,032,108 | * 2/2000 | Seiple et al. | 702/97 |

OTHER PUBLICATIONS

The Global Positioning System (GPS) and Its Commercial Applications; http://uadis.bpa.arizona.edu/byang/gps2.html#comm_ap; http://uadis.bpa.arizona.edu/byang/gpssov.html; Jan. 2, 1998.*

McCausland, J.; Gadgets for high–tech hiking; Sunset, Menlo Park; vol. 193, iss. 6; Dec. 1994; pp. 34.*

Global Position System Overview, Peter H. Dana, University of Texas at Austin, Copright 1998.

\* cited by examiner

*Primary Examiner*—Michael J. Zanelli

(57) ABSTRACT

An apparatus comprised of a processor, an actuator portion and a display portion is disclosed. The processor is comprised of a global positioning satellite integrated circuit. The processor is adapted to determine an initial position from a first satellite signal in response to an actuator element of the actuator portion and to determine a distance travelled from the initial position in response to a second satellite signal. The processor outputs the distance travelled from the initial position to the display element of the display portion. The processor receives a goal distance and the processor determines a distance remaining which is the difference between the goal distance and the distance travelled, and outputs the distance remaining to the display element of the display portion. A clock is provided for determining elapsed time and other timing variables. The processor sets an elapsed time variable to zero in response to the activation of the actuator element of the actuator portion and outputs the elapsed time to the display element of the display portion at various intervals or as the elapsed time is changing. The processor is adapted to divide the distance travelled by elapsed time to determine the rate of travel and to divide the distance remaining by the rate of travel to determine a time to finish and these variables are preferably output to a display element of the display portion. The processor, the display portion, and the actuator portion are preferably incorporated into a head piece of a watch. The watch also includes a watchband which is connected to the head piece.

20 Claims, 2 Drawing Sheets

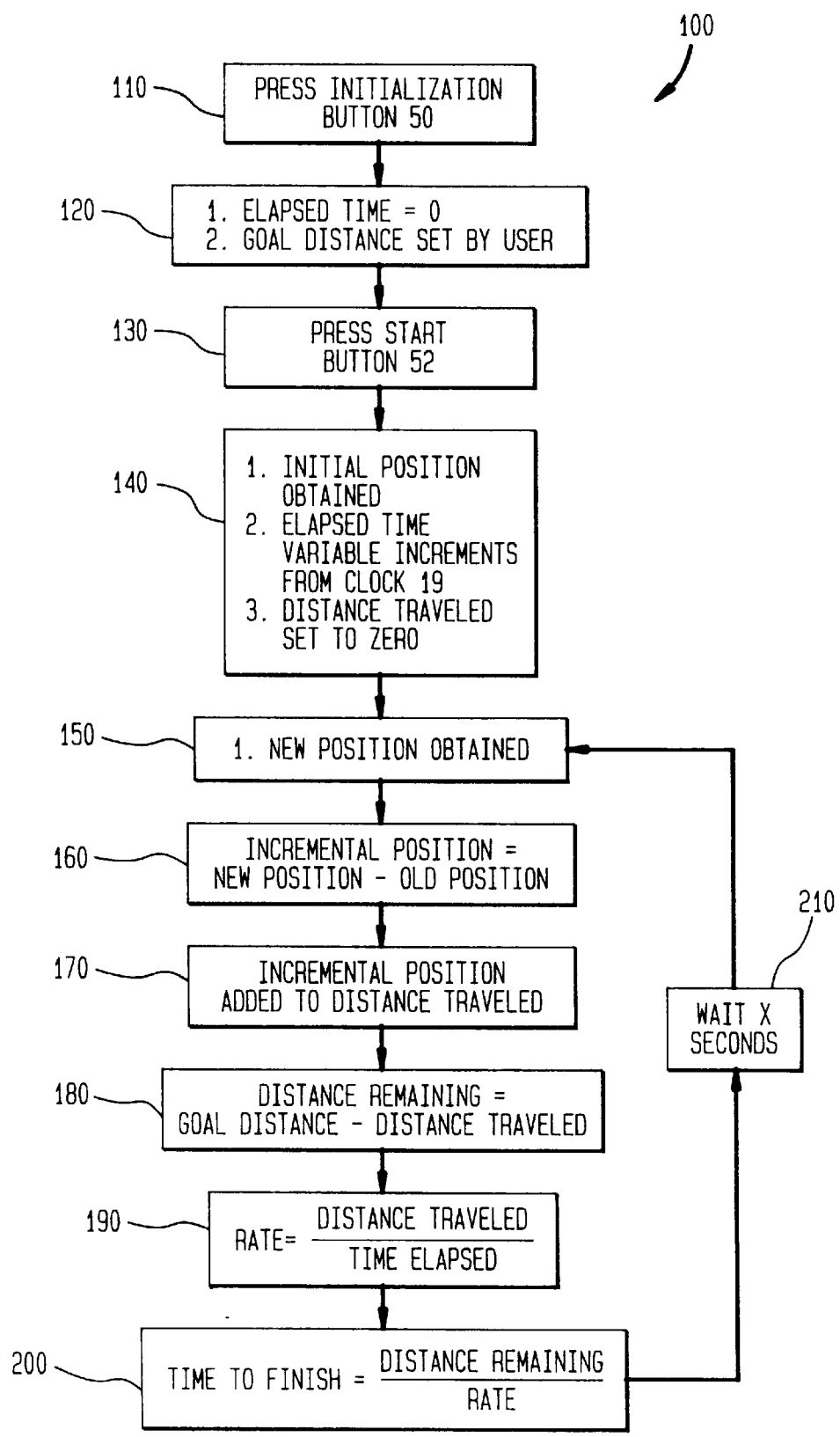

DEVICE FOR MEASURING AND DISPLAYING VARIOUS TRAVEL INFORMATION

FIELD OF THE INVENTION

This invention relates to improved methods and apparatus for display positioning and measuring information for runners, walkers, or other travellers.

BACKGROUND OF THE INVENTION

Runners, walkers, sportsman, and travellers often have a need to know how far they have travelled and how much longer they have to go. This is difficult to determine if the individual is not familiar with the area where he or she is travelling. Even if the individual is familiar with the area, he or she may want an accurate estimate of the distance or time left in order to reach a certain destination.

Portable devices are known in the art which include global positioning satellite integrated circuit receivers. These portable devices allow a hiker to check the total distance where he or she is currently located from a start point. If a hiker walks from the start point to a location five miles away and then back to the start point, the total distance from the start point when the hiker gets back is zero.

Mechanical devices are known which count the number of strides by a jogger to determine how far he has travelled. The mechanical devices would be inserted in a shoe of the jogger and would increase a count, each time the shoe was jolted by landing on the surface of a road. Multiplying this count times the stride distance would give the distance travelled.

SUMMARY OF THE INVENTION

In one embodiment of the present invention an apparatus comprised of a processor, an actuator portion and a display portion is disclosed. The processor is preferably comprised of a global positioning satellite integrated circuit. The processor is adapted to determine an initial position from a first satellite signal in response to an actuator element in the actuator portion and to determine a distance travelled from the initial position in response to a second satellite signal. The first and second satellite signals are preferably from different satellites. The processor preferably outputs the distance travelled from the initial position to a display element of the display portion.

The processor preferably is also adapted to receive a goal distance and the processor determines a distance remaining which is the difference between the goal distance and the distance travelled, and outputs the distance remaining to a display element of the display portion. In one embodiment of the present invention a clock is provided for determining elapsed time and other timing variables. The processor preferably sets an elapsed time variable to zero in response to the activation of an actuator element in the actuator portion and outputs the elapsed time to a display element of the display portion at various intervals or as the elapsed time is changing.

The processor is preferably adapted to divide the distance travelled by elapsed time to determine the rate of travel and to divide the distance remaining by the rate of travel to determine a time to finish and these variables are preferably output to a display element of the display portion.

The processor, the display portion, and the actuator portion are preferably incorporated into a head piece of a watch. The watch also includes a watchband which is connected to the head piece.

BRIEF DESCRIPTION OF THE DRAWINGS

FIG. 3 shows a flow chart of the operation of the watch used in FIG. 1.

DETAILED DESCRIPTION OF THE DRAWINGS

Figure 1:
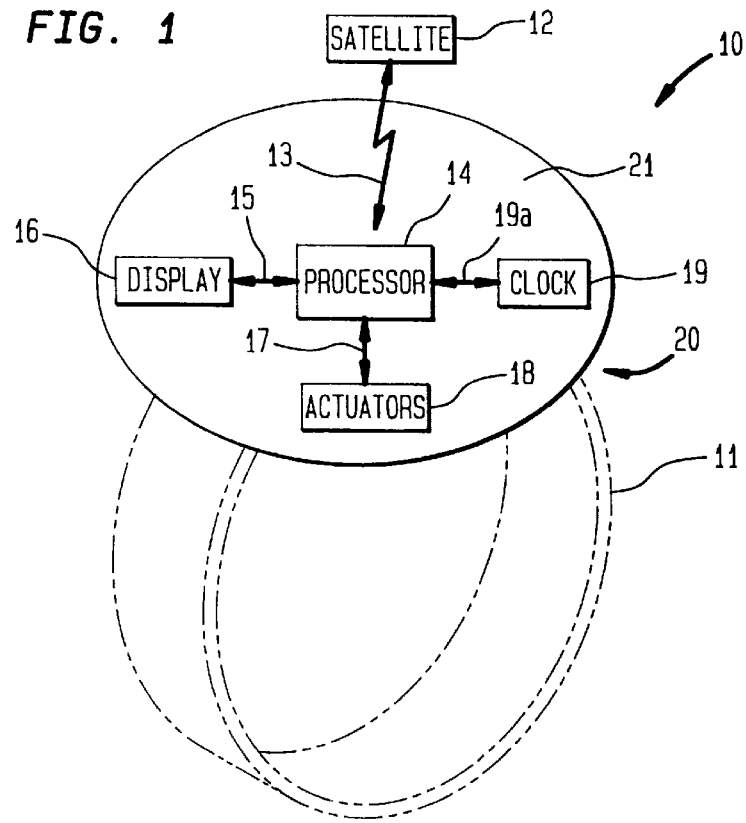
FIG. 1 shows a system for determining the distance travelled and the distance yet to be travelled for a traveller which includes a watch.

FIG. 1 shows a system 10 which includes a watch 20 which has a band 11 and a head piece 21. Various components are located in the head piece 21 in FIG. 1. The head piece 21 includes processor 14, display portion 16, an actuator portion 18, and a clock 19. The display portion 16 and the actuator portion 18 are actually comprised of different devices spread out on the head piece 21 but are shown as one unit in FIG. 1 for description purposes. The actuator portion 18 has an output connected to the input of the processor 14 via the bus 17. The display portion 16 has an input connected to the output of the processor 14 via bus 15. The clock 19 is connected via an input/output bus 19a. The system 10 also includes a satellite 12. The satellite 12 communicates to the processor 14 via an input/output 13.

Generally speaking the satellite 12 provides data to the processor 14 which allows the processor 14 to determine the geographical position of the watch 20. Preferably the processor 14 is comprised of a global position system integrated circuit. Again generally speaking the processor 14 supplies data to the display portion 16 for to display positioning information to a user and the processor 14 receives inputs from a user via actuator portion 18 and bus 17.

The watch 20 is preferably water resistant.

Figure 2:
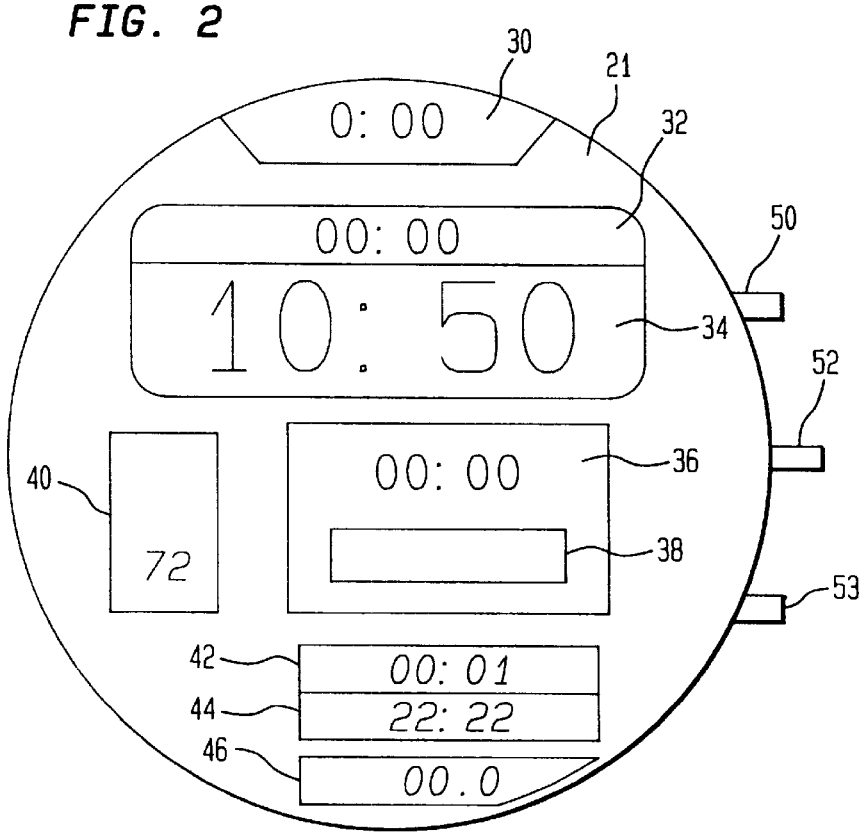
FIG. 2 shows various display portion and actuator portion aspects of the watch used in FIG. 1.

FIG. 2 shows various display portion 16 display elements and actuator portion 18 actuator elements of the head piece 21 of the watch 20. The display portion 16 display elements include pulse rate display portion 30, elapsed time display portion 32, real time display portion 34, running rate portion 36, time to finish display portion 38, temperature display portion 40, distance travelled display portion 42, distance remaining display portion 44, and goal distance variable portion 46. The running rate portion 36 shows the rate at which a user is running in miles per hour or kilometers per hour.

The actuator portion 18 actuator elements include the initialization button 50, the start button 52, and the goal distance variable button 53.

The operation of the aspects of the head piece 21 of the watch 20 will be explained with reference to the flow chart 100 shown in FIG. 3. In step 110 the initialization button 50 in FIG. 2, is pressed by a user. This causes an elapsed time variable to be set to zero by the processor 14 in step 120. The processor 14 also sets the goal distance variable to the actual distance of the running course (in kilometers or miles) in step 120 in response to a user. A user presses and holds down the button 53 which causes the number on the screen 46 to increment. When the user releases the button 53, the goal distance variable is set as remains on the screen 46. The user can clear the goal distance variable (such as for example in a manner similar to stop watches) by pressing down on the button 53 and releasing after the goal distance has been set.

In step 130 a user presses the start button 52. This causes the initial position variable to be obtained by the processor 14 from the satellite 12 shown in FIG. 1. The initial position may also be obtained from a plurality of satellite signals from a plurality of satellites (like satellite 12). In addition the processor 14 starts the elapsed time variable to begin incrementing in the manner of a timer. At the same time a distance travelled variable is set to zero by the processor 14.

At step 150 a new position variable is obtained by the processor 14 from the satellite 12. The old position variable is subtracted from the new position variable to form an incremental distance at step 160. At step 170 the incremental distance is added to the distance travelled variable to form the new distance travelled variable by processor 14. At step 180 the distance travelled is subtracted from the goal distance to determine the distance remaining variable. At step 190 the distance travelled is divided by the time elapsed to determine the rate of travel. At step 200 the distance remaining is divided by the rate of travel to determine the time to finish variable. The processor 14 determines these variables and displays them as appropriate. The processor 14 then waits x seconds for the next position sample from the satellite 12 at step 210. When the next position sample is received the processor 14 repeats the steps starting at step 150 for the new sample.

The temperature display portion 40 preferably is linked to a thermometer which measures −20 degrees C. to 60 degree C. (i.e. −4 degrees F. to 140 degrees F.).

I claim:

1. An apparatus comprised of:
a processor having an input capable of receiving a first satellite signal,
an actuator portion comprised of an actuator element;
a display;
wherein the processor is adapted to determine an initial position based on the first satellite signal in response to the actuator element;
wherein the processor is adapted to determine a distance traveled from the initial position based on a second satellite signal;
wherein the processor outputs the distance traveled from the initial position to the display;
and wherein the processor is adapted to receive a goal distance and the processor determines a distance remaining which is the difference between the goal distance and the distance traveled;
and the processor outputs the distance remaining to the display.

2. The apparatus of claim 1 and further comprised of:
a watchband;
wherein the processor, the display, and the actuator portion are incorporated into a head piece of a watch;
wherein the watchband is connected to the head piece of the watch.

3. The apparatus of claim 2 wherein:
the processor is comprised of a global positioning satellite integrated circuit.

4. The apparatus of claim 1 wherein:
the display is comprised of a first display element and a second display element;
and wherein the distance traveled from the initial position is output on the first display element and the distance remaining is output on the second display element, such that the distance traveled and the distance remaining thus appear at different locations on the display.

5. An apparatus comprised of:
a processor having an input capable of receiving a first satellite signal,
an actuator portion comprised of an actuator element;
a display;
wherein the processor is adapted to determine an initial position based on the first satellite signal in response to the actuator element;
wherein the processor is adapted to determine a distance traveled from the initial position based on a second satellite signal;
wherein the processor outputs the distance traveled from the initial position to the display;
and further comprising:
a clock;
wherein the processor sets an elapsed time variable to zero in response to the activation of the actuator element and outputs the elapsed time to the display.

6. The apparatus of claim 5 and further wherein:
the processor is adapted to divide the distance traveled by elapsed time to determine the rate of travel and the rate of travel is output to the display.

7. The apparatus of claim 6 and further wherein:
and wherein the processor is adapted to receive a goal distance and the processor determines a distance remaining which is the difference between the goal distance and the distance traveled:
and the processor outputs the distance remaining to the display;
and wherein the processor is adapted to divide the distance remaining by the rate of travel to determine a time to finish and the time to finish is output to the display.

8. The apparatus of claim 7 and wherein:
the display is comprised of first, second, third, and fourth display elements;
and wherein the distance traveled from the initial position is output on the first display element, the elapsed time is output on the second display element, the rate of travel is output on the third display element, and the time to finish is output on the fourth display element, such that the distance traveled from the initial position, the elapsed time, the rate of travel, and the time to finish thus appear at different locations on the display.

9. The apparatus of claim 6 and further wherein:
the display is comprised of first, second and third display elements;
and wherein the distance traveled from the initial position is output on the first display element, the elapsed time is output to the second display element, and the rate of travel is output on the third display element such that the distance traveled, the elapsed time, and the rate of travel thus appear at different locations on the display.

10. The apparatus of claim 5 and further comprised of:
a watchband;
wherein the processor, the display, and the actuator portion are incorporated into a head piece of a watch;
wherein the watchband is connected to the head piece of the watch.

11. The apparatus of claim 10 wherein:
the processor is comprised of a global positioning satellite integrated circuit.

12. The apparatus of claim 5 wherein
the display is comprised of a first display element and a second display element;
and wherein the distance traveled from the initial position is output on the first display element and the elapsed time is output to the second display element, such that the distance traveled and the elapsed time thus appear at different locations on the display.

13. The apparatus of claim 12 wherein the display is comprised of a third display element;

wherein the processor is adapted to receive a goal distance and the processor determines a distance remaining which is the difference between the goal distance and the distance traveled;

wherein the processor outputs the distance remaining to the display;

and wherein the distance remaining is output on the third display element, such that the distance traveled, the elapsed time, and the distance remaining thus appear at different locations on the display.

14. An apparatus comprised of:

a processor having an input capable of receiving satellite signals, an actuator portion comprised of an actuator element;

wherein the processor is adapted to:
determine a first position based on a first satellite signal in response to the actuator element;
initialize a total distance traveled variable to zero;
determine a second position based on a second satellite signal;
determine an incremental distance between the first position and the second position;
add the incremental distance to the total distance traveled variable;
determines a third position based on a third satellite signal;
determine an incremental distance between the second position and the third position; and
add the incremental distance to the total distance traveled variable;

and wherein the processor is adapted to receive a goal distance and the processor determines a distance remaining which is the difference between the goal distance and the total distance traveled.

15. The apparatus of claim 14 and further comprised of:

a display;

wherein the processor displays the total distance traveled variable on the display.

16. The apparatus of claim 15 wherein the display is comprised of a plurality of display elements, each display element situated at a different location of the display.

and wherein the total distance travelled variable is output to a first display element of the plurality of display elements.

17. The apparatus of claim 14 wherein the apparatus is further comprised of a display comprised of a plurality of display elements, each display element situated at a different location of the display;

and wherein the distance remaining is output to a first display element of the plurality of display elements.

18. The apparatus of claim 17 wherein the total distance travelled variable is output to a second display element of the plurality of display elements.

19. A method comprised of:

determining a first position based on a first satellite signal;

initializing a total distance traveled variable to zero;

determining a second position based on a second satellite signal;

determining an incremental distance between the first position and the second position;

adding the incremental distance to the total distance traveled variable;

determining a third position based on a third satellite signal;

determining an incremental distance between the second position and the third position; and adding the incremental distance to the total distance traveled variable;

receiving a goal distance and determining a distance remaining which is the difference between the goal distance and the total distance traveled.

20. The method of claim 19 and further comprised of:

displaying the total distance travelled variable.

\* \* \* \* \*